A. ANDRES.
CUTTING DEVICE.
APPLICATION FILED SEPT. 24, 1919.

1,388,500.

Patented Aug. 23, 1921.
2 SHEETS—SHEET 1.

Inventor
Albert Andree
per Knight Bro
Attorneys

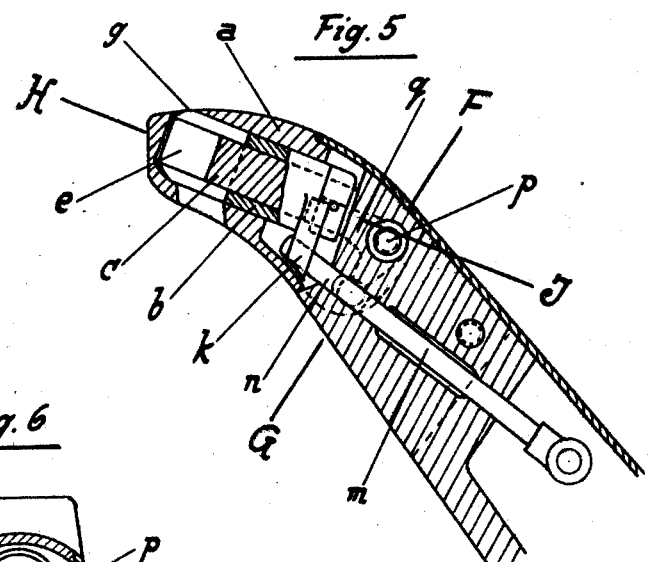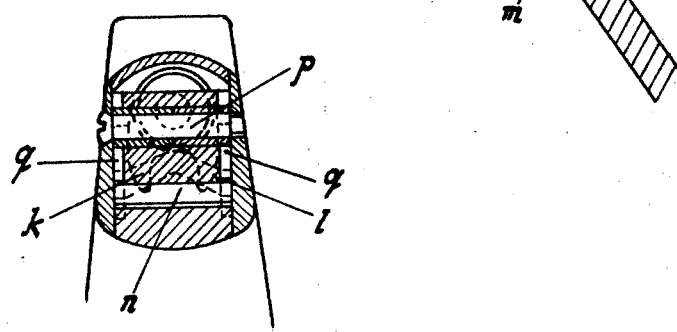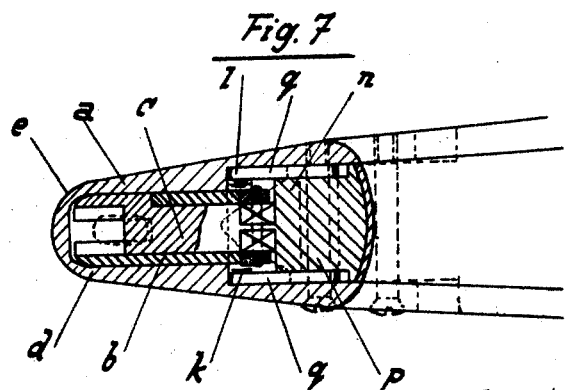

UNITED STATES PATENT OFFICE.

ALBERT ANDRES, OF CANNSTATT, GERMANY, ASSIGNOR TO THE FIRM OF FORTUNA-WERKE, SPEZIAL-MASCHINEN-FABRIK, G. M. B. H., OF CANNSTATT-STUTTGART, GERMANY.

CUTTING DEVICE.

1,388,500.      Specification of Letters Patent.      Patented Aug. 23, 1921.

Application filed September 24, 1919. Serial No. 326,102.

*To all whom it may concern:*

Be it known that I, ALBERT ANDRES, a citizen of Germany, of 84 Waiblingerstrasse, Cannstatt, Wurttemberg, German Republic, have invented certain new and useful Improvements in Cutting Devices, of which the following is a specification.

My invention relates to cutting devices and more especially to devices connected with shoe pegging machines for cutting off the ends of the wooden pegs which are projected through the sole of the shoe.

The majority of shoe pegging machines nowadays in use are provided to this end either with a reciprocating chisel or with a rotary cutter, the inner sole serving as an abutment in both cases. However the sole does not offer the necessary resistance and it therefore frequently happens that the pegs bend or break within the sole, thus rendering the fixation of the sole inferior. In a certain type of pegging machine the cutting tool has the form of nippers whose action is superior to that of the above mentioned appliances. But owing to the restricted space available in the forward end of the arm or horn carrying them they have to be kept so slender that they tend to break easily, especially so in the case when they accidentally come in contact with one of the iron pegs.

The cutting tool according to my invention although adopting in a general way the form of nippers, differs from the devices described above in that its cutting jaws instead of being fixed to a pair of scissors, are arranged on the circumference of a tubular socket and of a pin arranged in said socket respectively.

Figure 1:
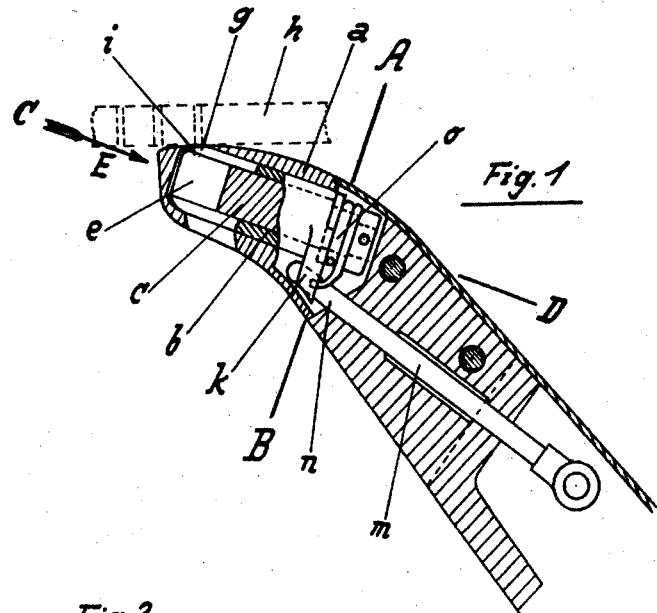
Figure 2:
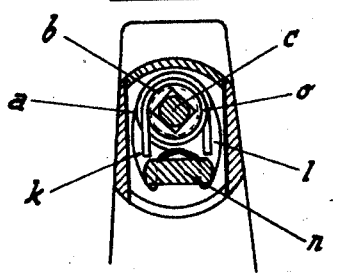
Figure 4:
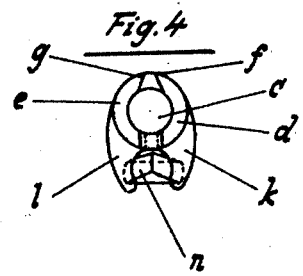
Figure 3:
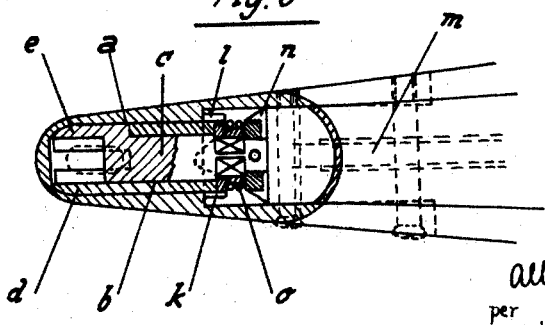

In the drawings affixed to this spscification and forming part thereof two modifications of a cutting device according to the present invention are illustrated, Figure 1 being a longitudinal section, Figs. 2 and 3 cross-sections on the lines A—B and C—D respectively, of one modification, Fig. 4 showing the same without the casing as viewed from the front. Figs. 5, 6 and 7 are a longitudinal section and two cross-sections on the lines F—G and H—J, respectively, of another modification.

In the hollow end $a$ of the work supporting arm or horn there is arranged a sleeve or hollow socket $b$ having a pin $c$ inserted therein. The forward portion of socket $b$ is cut away, leaving a part $d$ of crescent section, while another part $e$ of a like section is rigidly fixed to pin $c$. The parts $d$, $e$ are provided with cutting edges $f$, $g$ respectively, which may either be integral with said parts or may be fixed to them in any suitable manner. The two cutting edges are designed to grasp the points $i$ of the pegs projecting outwardly from the sole $h$ (Fig. 1) and cut them off cleanly close to the sole. The parts carrying the cutting edges may be actuated by different means. In the device shown in Figs. 1 to 4 lever arms $k$ and $l$ are fixed to the parts $b$ and $c$ respectively, and a wedge $n$ is fastened to the free end of a rod $m$ which, when moved in the direction of the cutters against the action of a spring $o$, will cause the arms $k$ and $l$ to be spread apart and the parts $d$, $e$ to revolve around their common axis, thus forcing the cutting edges $f$, $g$ against each other.

In the modification shown in Figs. 5 to 7 the cutting edges, instead of being forced apart by a spring, are guided back to their initial position by means of two angle levers $q$ oscillating around an axle $p$, and linked at one end to the wedge $n$, while the other ends are in contact with the lever arms $k$, $l$. Whenever the wedge is pulled back, the angle levers press against the outside of arms $k$, $l$ and thereby cause the nippers to open.

I wish it to be understood that my invention is not limited to the exact form and construction of the parts shown and described. Thus the cutting edges, instead of being arranged on the circumference of the parts $b$, $c$, may as well be disposed either below or above the circumference.

I claim:

1. In a device of the character described, in combination, a work-supporting arm, a hollow cutting edge carrier carried by said arm and extending substantially longitudinally of it, a second cutting edge carrier concentrically arranged within the first-named carrier, and means for imparting to at least one of said carriers a movement about their common axis.

2. In a device of the character described, in combination, a work-supporting arm, a hollow cutting edge carrier carried by said arm and extending substantially longitudinally of it, a second cutting edge carrier concentrically arranged within the first-named carrier, means for imparting to at least one of said carriers a movement about their common axis, and means for returning said carriers to their initial position.

3. In a device of the character described, in combination, a work-supporting arm, a hollow cutting edge carrier carried by said arm and extending substantially longitudinally of it, a second cutting edge carrier concentrically arranged within the first-named carrier, and means for imparting to said carriers a movement about their common axis in opposite directions.

4. In a device of the character described, in combination, a work-supporting arm, a hollow cutting edge carrier carried by said arm and extending substantially longitudinally of it, a second cutting edge carrier concentrically arranged within the first-named carrier, cutting edges opposite each other arranged on said carriers, and means for imparting to at least one of said carriers a movement about their common axis to bring said cutting edges together.

5. In a device of the character described, in combination, a work-supporting arm, a hollow cutting edge carrier carried by said arm and extending substantially longitudinally of it, a second cutting edge carrier concentrically arranged with the first-named carrier, an arm on each of said carriers, and means for spreading said arms apart to move at least one of said carriers about their common axis.

6. In a device of the character described, in combination, a work-supporting arm, a hollow cutting edge carrier carried by said arm and extending substantially longitudinally of it, a second cutting edge carrier concentrically arranged within the first-named carrier, an arm on each of said carriers, means for spreading said arms apart to move at least one of said carriers about their common axis, and means for returning said carriers to their initial position.

In testimony whereof I affix my signature in presence of two witnesses.

ALBERT ANDRES.

,Witnesses:
FRIEDRICH EPPLER,
EMILIE DEYLE.